United States Patent
Obst et al.

(10) Patent No.: US 12,292,721 B2
(45) Date of Patent: May 6, 2025

(54) MODULE FOR A PROCESS ENGINEERING SYSTEM AND METHOD FOR CONTROLLING A PROCESS ENGINEERING SYSTEM

(71) Applicant: WAGO Verwaltungsgesellschaft mbH, Minden (DE)

(72) Inventors: Michael Obst, Dresden (DE); Thomas Holm, Bremen (DE); Jörg Malken, Minden (DE); Sven Kreft, Spenge (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 17/682,489

(22) Filed: Feb. 28, 2022

(65) Prior Publication Data

US 2022/0179383 A1 Jun. 9, 2022

Related U.S. Application Data

(63) Continuation of application No. 14/927,562, filed on Oct. 30, 2015, now Pat. No. 11,300,935.

(30) Foreign Application Priority Data

Nov. 4, 2014 (DE) ...................... 10 2014 222 508.6

(51) Int. Cl.
*G05B 19/418* (2006.01)
*G05B 19/042* (2006.01)
(Continued)

(52) U.S. Cl.
CPC ..... *G05B 19/042* (2013.01); *G05B 19/41845* (2013.01); *C21D 11/00* (2013.01); *G06F 3/14* (2013.01)

(58) Field of Classification Search
CPC .............................................. G05B 19/41845
See application file for complete search history.

(56) References Cited

U.S. PATENT DOCUMENTS

| | | | | |
|---|---|---|---|---|
| 5,448,490 A | * | 9/1995 | Gottlieb | ................ B07C 1/00 700/220 |
| 6,848,933 B1 | * | 2/2005 | Delaney, III | ......... H01R 25/145 439/948 |

(Continued)

FOREIGN PATENT DOCUMENTS

| CN | 1539097 A | 10/2004 |
|---|---|---|
| CN | 201320559 Y | 10/2009 |

(Continued)

OTHER PUBLICATIONS

Reiner Bühler, Google patents translation of WO2006100296A1, Sep. 2006, URL :<https://patents.google.com/patent/WO2006100296A1/en?oq=WO2006100296> (Year: 2006).*

(Continued)

*Primary Examiner* — Kamini S Shah
*Assistant Examiner* — Jonathan Michael Skrzycki
(74) *Attorney, Agent, or Firm* — Renner, Otto, Boisselle & Sklar, LLP

(57) ABSTRACT

A module for a process engineering system having process engineering hardware for carrying out a process engineering sub-process, a control system for local control of the process engineering hardware, the control system being set up to control the process engineering hardware independently and bring it to a number of specific defined states, and an external interface of the control system, the external interface being able to receive a number of defined commands which correspond to the specific defined states of the process (Continued)

engineering hardware. In addition, a method is claimed for controlling a process engineering system which is made up of a plurality of modules.

11 Claims, 2 Drawing Sheets

(51) Int. Cl.
*C21D 11/00* (2006.01)
*G06F 3/14* (2006.01)

(56) References Cited

U.S. PATENT DOCUMENTS

| | | | |
|---|---|---|---|
| 7,069,105 B2 | 6/2006 | Reinisch et al. | |
| 7,703,093 B2 | 4/2010 | Fischer et al. | |
| 7,705,742 B1 | 4/2010 | Delaney, III et al. | |
| 8,280,533 B2 | 10/2012 | Wojsznis et al. | |
| 8,509,927 B2 | 8/2013 | Schmidt et al. | |
| 9,459,607 B2 | 10/2016 | Frazer et al. | |
| 10,101,720 B2 | 10/2018 | Frazer et al. | |
| 10,108,184 B2* | 10/2018 | Ochs | G05B 19/4185 |
| 2003/0040812 A1 | 2/2003 | Gonzales et al. | |
| 2004/0260404 A1* | 12/2004 | Russell | H04L 41/0856 700/1 |
| 2005/0226794 A1* | 10/2005 | Hodge | G05D 27/02 422/243 |
| 2006/0192653 A1 | 8/2006 | Atkinson et al. | |
| 2008/0002737 A1 | 1/2008 | Schwenkel et al. | |
| 2009/0319060 A1 | 12/2009 | Wojsznis et al. | |
| 2012/0256566 A1 | 10/2012 | Chaffee | |
| 2014/0099491 A1 | 4/2014 | Ameen et al. | |
| 2014/0295044 A1 | 10/2014 | Cocchi et al. | |
| 2015/0104796 A1* | 4/2015 | Goemann-Thoss | G01N 35/0092 435/6.12 |
| 2015/0301522 A1* | 10/2015 | Ochs | G05B 19/4185 700/266 |

FOREIGN PATENT DOCUMENTS

| | | | | |
|---|---|---|---|---|
| CN | 101930215 A | | 12/2010 | |
| CN | 102193533 A | | 9/2011 | |
| CN | 104025095 A | | 9/2014 | |
| CN | 104068198 A | | 10/2014 | |
| DE | 100 12 579 A1 | | 9/2001 | |
| DE | 10 2005 035 667 A1 | | 3/2007 | |
| DE | 10 2008 024 461 A1 | | 12/2009 | |
| DE | 10 2009 042 368 A1 | | 3/2011 | |
| DE | 10 2010 005 007 A1 | | 7/2011 | |
| EP | 2 783 574 A1 | | 10/2014 | |
| GB | 519042 A | | 3/1940 | |
| JP | H08-211912 A | | 8/1996 | |
| WO | WO2006100296 | * | 3/2006 | B01J 19/00 |
| WO | WO2006100296 A1 | * | 9/2006 | B01J 19/00 |

OTHER PUBLICATIONS

Notice of Reasons for Refusal for corresponding Japanese Patent Application No. 2015-216484, dated Sep. 25, 2019.
Translation of Chinese Office Action for corresponding Chinese Patent Application No. 201511035985.2, dated Oct. 25, 2019.
Chinese Office Action and translation for corresponding Chinese Patent Application No. 201511035985.2, dated Jul. 16, 2020.
Chinese Office Action for corresponding Chinese application No. 202010157334.5, mailed Sep. 22, 2023, with English Translation.

* cited by examiner

MODULE FOR A PROCESS ENGINEERING SYSTEM AND METHOD FOR CONTROLLING A PROCESS ENGINEERING SYSTEM

This application is a continuation of U.S. patent application Ser. No. 14/927,562 filed Oct. 30, 2015, which claims priority of German Patent Application No. 102014222508.6 filed Nov. 4, 2014, all of which are hereby incorporated herein by reference in their entireties.

1. FIELD OF THE INVENTION

The present invention relates to process engineering systems and the control thereof. In particular, the present invention relates to modularly constructible process engineering systems.

2. PRIOR ART

In the process industry, in particular in chemistry, pharmaceuticals and food production, the product quantities in demand are increasingly difficult to forecast and fluctuate depending on region in short-term time intervals. In addition, product life cycles are becoming shorter and shorter on the whole, due to the global availability of alternatives.

However, conventional production systems often are not designed for these fluctuating product quantities. Continuously operated systems are optimized in most cases for a certain quantity of product per time unit, and even for batch operation are less efficient and require many nonproductive time periods, for example cleaning times and conversion times.

When adding to or converting the system, it is normally necessary to also reconfigure or reprogram the corresponding system controller. This is an expensive process, which often takes time comparable to the hardware conversion. This is made more difficult by possibly inadequate documentation for the existing control software, or outdated control hardware which may not provide all of the requisite functions for the new hardware.

More recent developments in the process industry deal with modular system concepts, in which the system is constructed of individual prefabricated modules. Such concepts and their challenges are described in a survey "*Modulare Anlagenkonzeption und Automatisierung mithilfe des β-Projektes*" ('*Modular System Conception and Automation with the Aid of the β Project*') by Graduate Engineer Sabine Mühlenkamp and Wolfgang Ernhofer, May 10, 2012, in "*Process*." There too, integration of the modules with control technology is still regarded as an open question.

The object of the present invention is therefore to develop process engineering systems more flexibly with regard to their production rate, to speed up system planning and construction, and to make suitable means and methods available for these tasks.

3. SUMMARY OF THE INVENTION

The above object is fulfilled by a module for a process engineering system according to claim 1 and by a method for controlling a process engineering system according to claim 11.

In particular, the above-named object is fulfilled by a module for a process engineering system having process engineering hardware for carrying out a process engineering sub-process, a control system for local control of the process engineering hardware, the control system being set up to control the process engineering hardware independently and bring it to a number of specific defined states, and an external interface of the control system, the external interface being able to receive a number of defined commands which correspond to the specific defined states of the process engineering hardware.

A process engineering system may be made up of a plurality of these modules. If more production capacity is desired, modules may be connected to the system in a simple manner and then carry out specific sub-processes. To this end, the modules may assume a defined number of specific states. Since the controller of the particular module controls the process engineering hardware locally and independently, and is able to bring it to one state out of the number of specific defined states, the control effort of the overall system is minimized. A superordinate controller of the overall system thus needs only to send defined commands to the external interface of the controller of the module, so that the latter is able to move to and then assume one of its defined states. The superordinate system may give commands for example to start the sub-process, to change the operating mode of the module, to pause or to stop the sub-process. The module-internal controller for attaining the defined state thereupon takes over control of the module automatically, without intervention from outside. The controller of the module may thus be provided, programmed and configured already by the producer of the module, so that the producer of the system is able to create the control of the overall system with very little effort and expense.

Accordingly, when a hardware modification is made to a production engineering system, the central, superordinate controller of the overall system needs only to give high-level commands to the corresponding modules, and the majority of the control effort is performed decentrally and automatically in the individual modules.

To receive the defined high-level commands, the controller of the module has the forenamed external interface. There is no provision for the external interface to be able to directly control actuators of the respective module. This control is the responsibility of the controller of the module.

Preferably, the external interface is able to receive exclusively commands that correspond to the specific defined states of the process engineering hardware. Accordingly, only the forenamed high-level commands are able to be received through the external interface of the module. Other commands are not receivable, and thus are also not processable by the controller of the module.

The controller preferably controls the transition of the process engineering hardware between the specific defined states independently, without commands from outside. This does not require control by a superordinate control system. The module is therefore self-sufficient with regard both to hardware and to control technology.

By preference, no intermediate states of the process engineering hardware are addressable through the external interface. It is thus exclusively the defined states of the module that are addressable via the external interface, which minimizes the control effort for a superordinate control system.

The external interface is preferably also set up to issue defined commands to modules connected upstream, downstream or in parallel. That enables modules to address each other in parallel communication. For example, an upstream module is able to start a downstream module when it has finished an intermediate product for further processing. It is of course equally possible for modules that are connected in parallel to also be in command of each other or to be subject to joint commands.

The external interface is preferably set up to receive the defined commands from upstream or downstream modules. Accordingly, for horizontal communication of the modules with each other the external interface is also able to receive the defined commands from modules connected upstream or downstream or in parallel.

The external interface is preferably also set up to receive the defined commands from a superordinate system controller.

Furthermore, the external interface is preferably set up to issue data to a superordinate system controller. The external interface is also able to issue data to the system control; for example, signals that indicate whether the particular defined state has been reached, whether the module is working faultlessly or whether there is a malfunction of the module.

A process engineering system preferably has a plurality of the modules defined above. That enables the process engineering system to be expanded easily with additional modules, reduced in size, or converted for other products, without need of great expense to adapt superordinate controls.

The process engineering system preferably also has a superordinate system controller for issuing defined commands that correspond to the specific defined states of the process engineering hardware.

The forenamed objects are also fulfilled by a method for controlling a process engineering system, the system being made up of a plurality of modules, each of which has process engineering hardware for carrying out a process engineering sub-process, as well as a controller for locally controlling the process engineering hardware and an external interface of the control, the external interface being able to receive a number of defined commands that correspond to a number of specific defined states of the process engineering hardware, and the method having the following steps:
 a. reception by the external interface of a module of a command from the number of defined commands for the particular module;
 b. automatic control of the process engineering hardware of a module by the corresponding controller in accordance with the received command, in order to bring the process engineering hardware of the module to one of the number of specific defined states.

Because each module has its own control, and has to receive through its external interface only defined commands that correspond to one state out of a number of specific defined states of the process engineering hardware of the module and the process engineering hardware is then controlled automatically by the respective controller in order to bring it to one of the number of specific defined states, the advantages of easy control technology system configuration already described above result. The overall system can thus on the one hand be constructed very easily in modular form, while the overall control is easy to create. On the other hand, modules can also easily be added, eliminated or replaced by other modules, without the need of major reconfigurations or even reprogramming of the superordinate control software of the overall system.

Furthermore, the method preferably has the step of reception by at least one of the modules of defined commands from modules connected upstream or downstream or in parallel.

Furthermore, the method preferably has the step of reception by at least one of the modules of defined commands from a superordinate controller.

Furthermore, the method preferably has the step of issuing by at least one of the modules of defined commands to modules connected upstream or downstream or in parallel. That results in horizontal communication between the modules of a system.

Furthermore, the method preferably has the step of issuing by at least one of the modules of signals to a superordinate controller. That results in vertical communication between superordinate controller and the modules of a system.

Furthermore, the method preferably has the step of issuing of a control pattern to the superordinate controller by at least one of the modules. By means of the control pattern, which communicates among other things properties and addressing options of the module to the superordinate controller during initial installation, the effort of programming the control software of the superordinate controller is further minimized. The module can likewise be integrated there in terms of data technology as a ready-made data module. The control pattern may contain in particular a description of the function of the module, the defined states, the defined commands, a user interface and a graphic representation of the module.

BRIEF DESCRIPTION OF THE DRAWINGS

In the following section preferred embodiments of the present invention are described with the aid of the drawings, in which the figures show the following.

DESCRIPTION OF PREFERRED EMBODIMENTS

Preferred embodiments of the present invention are described below in detail in reference to the figures.

Figure 1:
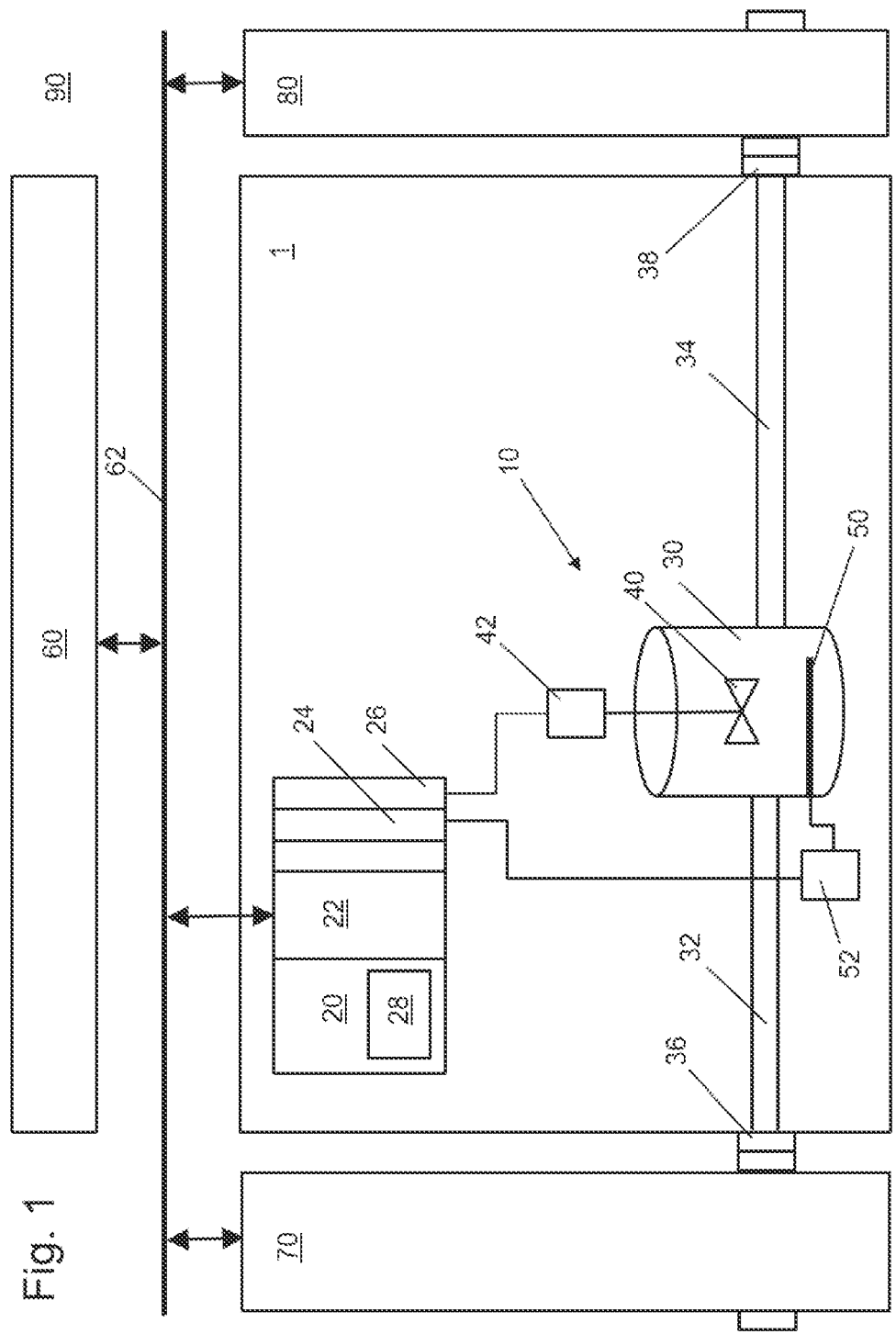
FIG. 1 a schematic view of a process engineering system having a plurality of modules.

FIG. 1 shows a process engineering system 90 which is made up of a plurality of individual modules 1, 70, 80 and possibly additional modules that are not shown. Furthermore, the process engineering system 90 has a superordinate controller 60 which communicates with the individual modules 1, 70, 80 through a suitable bus 62.

Module 1 of the process engineering system 90 stands as an example for all modules 1, 70, 80 of the process engineering system 90. It comprises process engineering hardware 10 for carrying out a process engineering sub-process. In the depicted example, the process engineering hardware 10 comprises for example a reactor 30, which has a mixer 40 that is driven by means of an electric motor 42. Furthermore, the reactor 30 has an electric heating rod 50 which is activated by means of power electronics 52. The reactor 30 itself consists of a preferably closed vessel, to which an input tube 32 and an output tube 34 are connected in order to fill or empty it. The input tube 32 extends to the outer boundary of the exemplary module 1, and ends there in an input flange 36. The output tube 34 also extends to the system boundary of module 1, and ends there in an output flange 38. Module 1 is connectible by means of the input flange 36 to an upstream module 120, and by means of the output flange 38 to a downstream module 130. Other process engineering interconnection options are of course also possible, for example multiple inputs of multiple outputs, or parallel connection of modules 1, 70, 80.

Furthermore, module 1 has a controller 20 for local control of its process engineering hardware 10. The controller 20 is set up so that it can control the process engineering hardware 10 automatically, i.e., in this case for example the electric motor 42 of the stirring system 40 and the power electronics 52 of the heating rod 50. That enables the controller 20 to bring module 1 to a defined state in terms of process engineering. Module 1 has a number of precisely defined process engineering states, and can change among these states automatically upon command. That enables the module for example to carry out a process engineering sub-process automatically without influence from outside.

Furthermore, module 1 may have for example sensors (not shown), such as flow, pressure or temperature sensors, or electrically operable valves or similar elements. Such sensors or actuators are likewise connected to the controller 20, and can be queried or controlled by the controller 20.

To this end the controller 20 has I/O modules 24, 26, with which the controller 20 can address actuators such as the electric motor 42 of the stirring system 40 or the power electronics 52 of the heating rod 50. Additional I/O modules for any sensors or additional actuators are present if they are necessary for the process engineering function of module 1.

Modules 70 and 80 and additional module can be constructed similarly to module 1, in which case they likewise have a controller similar to controller 20 which is able to control the process engineering hardware of the respective module locally and automatically and can bring the module in each case to a number of specific defined states. Accordingly, modules 1, 70, 80 are innately automatic with regard to control engineering, so that the process engineering hardware and control together form a flexibly employable module for a process engineering system 90 which can be combined virtually per plug and play with regard to process engineering and control engineering into an overall system 90.

The overall system 90 includes a superordinate controller 60, which is connected by means of a bus 62 in terms of control engineering to the individual modules 1, 70, 80. The superordinate controller needs only to send precisely defined commands to the individual modules 1, 70, 80, so that these assume one of their predetermined, defined states. In this case the superordinate controller 60 does not need to know either the control details or the individual elements of the process engineering hardware 10 of the respective module 1, 70, 80, nor to address these individual elements. On the contrary, the superordinate controller 60 is preferably supposed to send only high level commands to the individual modules 1, 70, 80, so that these then automatically assume the respective states in order to carry out their process engineering sub-process. This control concept simplifies the planning, project design and construction of process engineering systems 90. Module 1 brings along as it were, besides its process engineering hardware 10, its complete control in modular form, so that the expense of superordinate controller is minimized.

For the controller 20 of module 1 to communicate with the superordinate controller 60 or the other modules 70, 80 through the bus 62, the controller 20 has an external interface 22. Via the external interface 22 module 1 is able to receive a number of defined commands, which correspond to the specific defined states of their process engineering hardware 10. Preferably, the external interface 22 is able to receive exclusively commands that correspond to the specific defined states of the process engineering hardware 10. The controller 20 is then responsible for controlling the transition of the process engineering hardware 10 between the specific defined states independently, without commands from outside.

Furthermore, the controller 20 is able to automatically take over all safety functions, reporting functions and record-keeping functions for the particular module 1, so that the superordinate controller 60 is relieved of this task as well. It is likewise possible to operate module 1 manually by means of the controller 20 without a superordinate control, for example if only very small quantities are to be produced and a tie-in to a superordinate controller would not pay in this case. To this end module 1 has a user interface or operating panel of its own.

Via the external interface 22, module 1 can also issue defined commands to modules located upstream or downstream or connected in parallel. Thereby module 1 can for example notify the upstream module 70 to forward a primary product to module 1, if module 1 is to use it. Module 1 can likewise issue a defined command to the downstream module 80 when it has completed the processing and wishes to pass the finished intermediate product on to module 80 for further processing. Accordingly, modules 1, 70, 80 are able to carry out horizontal communication among themselves, without a superordinate controller 60 necessarily being interposed.

Examples of defined states of modules 1, 70, 80 are: "idling," "running," "Stop," "stopped," "interrupted" and "finished." In addition, the "running" state can be broken down into different operating modes, if this is possible for the sub-process. In that way the sub-process can proceed for example with different parameters or with different progressions. Accordingly, appropriately defined commands can be delivered via the external interface 22 to module 1, in order to instruct the latter's controller 20 to go to the corresponding state. The transition between the individual states is then regulated automatically by the controller 20. For example, if the product is to be processed in the reactor 30 on the basis of a particular temperature curve and at a particular speed of the stirrer 40, the controller 20 controls accordingly by means of I/O modules 24 and 26 the speed of the motor 42 of the stirrer 40 as well as the power which is delivered by the power unit 52 to the heating rod 50, in order to heat the product in the reactor 30 on the basis of the temperature curve. As soon as the desired state of module 1 is reached, the external interface 22 can report this to the superordinate controller 60 or to the modules 70, 80 connected upstream or downstream or in parallel. In addition, status data of the module can also be issued to the superordinate controller 60 via the external interface 22, for example for visualization or for statistical record-keeping.

Figure 2:
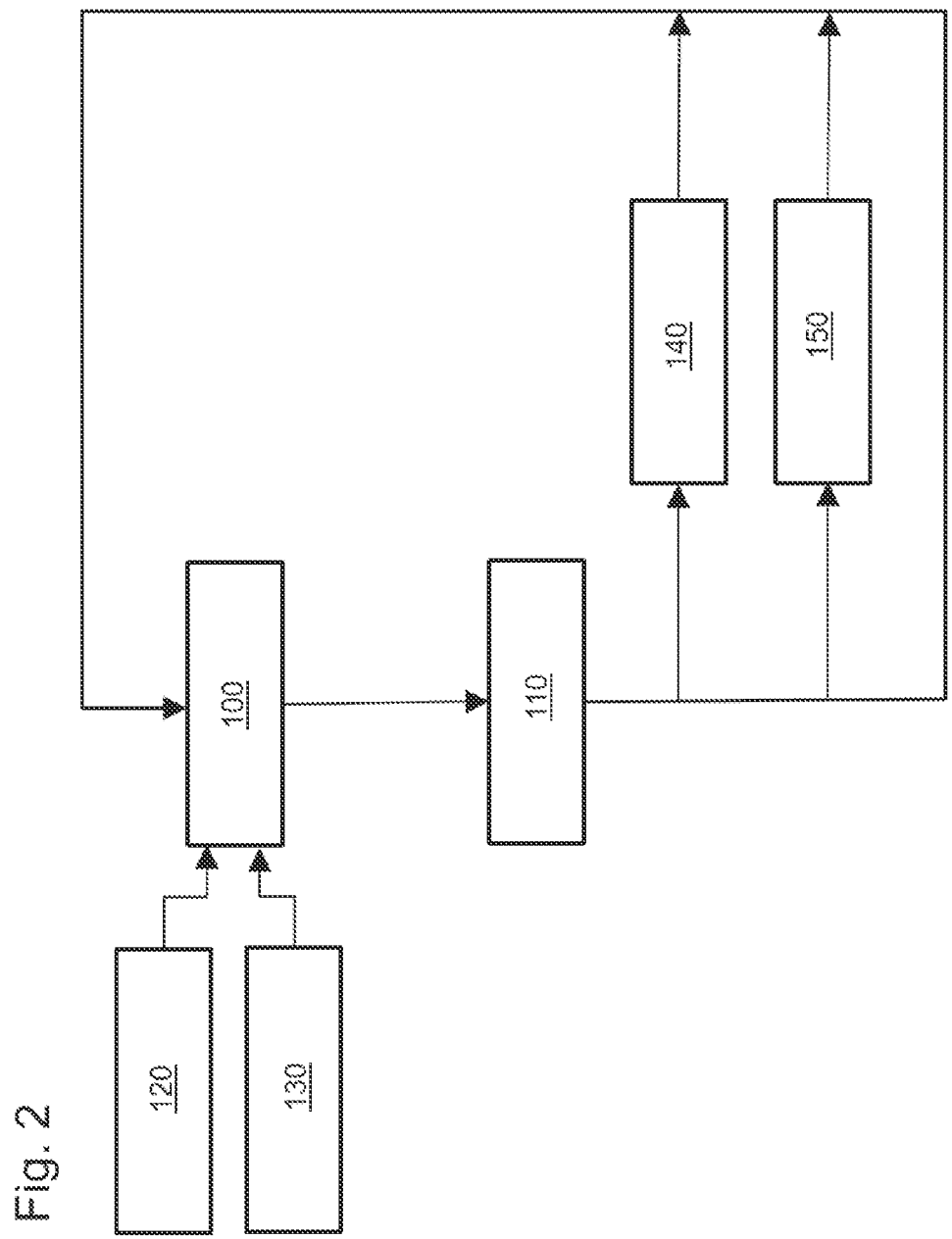
FIG. 2 a flow chart of a method for controlling a process engineering system.

FIG. 2 shows a flow chart for a method for controlling a process engineering system 90, where the system is made up of a plurality of modules 1, 70, 80, each of which has process engineering hardware for carrying out a process engineering sub-process. First, in step 100 a command from a number of defined commands for a particular module 1 is received by the external interface of module 1. In this case the commands correspond to a number of specific defined states of the process engineering hardware of module 1.

After module 1 has received the defined command for a change of state, in step 110 module 1 controls by means of its module-internal controller 20 its process engineering hardware, in order to bring it to the desired defined state. If this has occurred, in step 140 the module can issue defined commands to the modules 70, 80 connected upstream or downstream or in parallel, in order to cause them to carry out their corresponding sub-processes of the process engineering method. In addition, in step 150 module 1 can issue data to the superordinate controller 110, in order for example to report to the latter the internal state of module 1 or to signal the completion of an intermediate product.

Step 100 of the reception by the external interface of a module of a command from the number of defined commands for the particular module 1 can occur in step 120 by one of the modules 70, 80 connected upstream or downstream or in parallel. In step 130, the reception of defined commands of a module can occur by a superordinate controller 60.

In addition, in step 150 the controller 20 can also issue a module-specific control pattern 28 to the superordinate controller 60. This preferably occurs when module 1 is first started up. It reports to the superordinate controller 60 its control pattern 28, which describes among other things properties and actuating options of the module. The superordinate controller can then recognize module 1 in terms of data technology, and can integrate it into its control software as a ready-made data module. The control pattern 28 may contain in particular a description of the function of the module, the defined states, the defined commands, a user interface and a graphic representation of the module.

REFERENCE LABELS

1 module
10 process engineering hardware
20 controller
22 external interface
24, 26 I/O module
28 control pattern
30 reactor
32 input line
34 output line
36 input flange
38 output flange
40 stirring system
42 motor
50 heating rod
52 power electronics
60 superordinate controller
62 data bus
70, 80 additional modules
90 process engineering system
100 reception of a command
110 automatic control of the process engineering hardware
120 reception of a command from other modules
130 reception of a command from superordinate control
140 issuing of commands to other modules
150 issuing of data or a control pattern to superordinate control

The invention claimed is:

1. A module for a process engineering system including further modules for industrial product production in chemistry, pharmaceutical, or food production, the module having:
   process engineering hardware for carrying out a process engineering sub-process that processes a product, wherein the process engineering hardware receives a primary product via an input flange and input tube from an upstream module of the further modules of the process engineering system, processes the primary product and passes the processed product via an output flange and output tube to a downstream module of the further modules of the process engineering system;
   a controller for local controlling of the process engineering hardware, the controller being set up to control the process engineering hardware and bring it to specific defined states; and
   an external interface of the controller, wherein the external interface receives a number of defined commands that correspond to the specific defined states of the process engineering hardware;
   wherein the external interface receives said defined commands that correspond to the specific defined states of the process engineering hardware from the further modules that are connected upstream or downstream or in parallel, such that the received defined commands bring the module to the corresponding specific defined states;
   wherein the external interface issues to the further modules defined commands that correspond to specific defined states of process engineering hardware of the further modules, such that the issued defined commands bring the further modules to the corresponding specific defined states;
   wherein upon startup the controller issues a module-specific control pattern to a superordinate system controller, such that the superordinate system controller integrates the module into control software of the superordinate system controller; and
   wherein the module-specific control pattern contains a description of the function of the module, the specific defined states, a user interface, a graphic representation of the module, and the defined commands.

2. The module according to claim 1, wherein the external interface receives exclusively commands that correspond to the specific defined states of the process engineering hardware.

3. The module according to claim 1, wherein the controller controls the transition of the process engineering hardware between the specific defined states automatically without commands from outside.

4. The module according to claim 1, wherein no intermediate states of the process engineering hardware are addressable via the external interface.

5. The module according to claim 1, wherein the external interface is additionally set up to receive the defined commands from the superordinate system controller.

6. The module according to claim 1, wherein the external interface is additionally set up to issue signals to the superordinate system controller.

7. A process engineering system having a plurality of modules for industrial product production in chemistry, pharmaceutical, or food production, each module having:
   process engineering hardware for carrying out a process engineering sub-process that processes a product, wherein the process engineering hardware receives a primary product via an input flange and input tube from an upstream module of the plurality of modules of the process engineering system, processes the primary product and passes the processed product via an output flange and output tube to a downstream module of the plurality of modules of the process engineering system
   a controller for local controlling of the process engineering hardware, the controller being set up to control the process engineering hardware and bring it to a number of specific defined states; and
   an external interface of the controller, the external interface receives a number of defined commands that correspond to the specific defined states of the process engineering hardware, such that the received defined commands bring the module to the corresponding specific defined states;

wherein the external interface receives said defined commands that correspond to the specific defined states of the process engineering hardware from further modules that are connected upstream or downstream or in parallel;

wherein the external interface issues to the further modules defined commands that correspond to the specific defined states of process engineering hardware of the further modules, such that the issued defined commands bring the further modules to the corresponding specific defined states;

wherein upon startup the controller issues a module-specific control pattern to a superordinate system controller, such that the superordinate system controller integrates the plurality of modules into control software of the superordinate system controller; and wherein the module-specific control pattern contains a description of the function of the module, the specific defined states, a user interface, a graphic representation of the module, and the defined commands.

8. The process engineering system according to claim 7, wherein the superordinate system controller is configured for issuing defined commands that correspond to the specific defined states of the process engineering hardware of the modules.

9. A method for controlling a process engineering system, the system being made up of a plurality of modules for industrial product production in chemistry, pharmaceutical, or food production, each of which has process engineering hardware for carrying out a process engineering sub-process, as well as a controller for locally controlling the process engineering hardware and an external interface of the controller, the external interface being able to receive a number of defined commands that correspond to a number of specific defined states of the process engineering hardware, and the method having the following steps:

receiving by the external interface of at least one of the modules of a command from the number of defined commands for the at least one of the modules from further modules of the plurality of modules that are connected upstream or downstream or in parallel;

receiving with the process engineering hardware a primary product via an input flange and input tube from an upstream module of the plurality of modules of the process engineering system;

processing the primary product with the process engineering hardware and passing the processed product via an output flange and output tube to a downstream module of the plurality of modules of the process engineering system;

automatically controlling the process engineering hardware of a module by the corresponding controller in accordance with the received command that corresponds to the specific defined states of the process engineering hardware, in order to bring the process engineering hardware of the module to one of the number of specific defined states;

issuing by the external interface to the further modules defined commands that correspond to specific defined states of process engineering hardware of the further modules, such that the received defined commands bring the further modules to the corresponding specific defined states;

upon startup, issuing by the at least one of the modules of a module-specific control pattern to a superordinate system controller, such that the superordinate system controller integrates the plurality of modules into control software of the superordinate system controller; and wherein the module-specific control pattern contains a description of the function of the at least one of the modules, the specific defined states, a user interface, a graphic representation of the module, and the defined commands.

10. The method according to claim 9, additionally having the following step:

receiving by the at least one of the modules of defined commands from a superordinate controller.

11. The method according to claim 9, additionally having the step:

issuing by the at least one of the modules of data to a superordinate controller.

* * * * *